US011940152B2

(12) United States Patent
Godfrey et al.

(10) Patent No.: US 11,940,152 B2
(45) Date of Patent: *Mar. 26, 2024

(54) FUEL CIRCUIT FOR A FUEL INJECTOR

(71) Applicant: General Electric Company, Schenectady, NY (US)

(72) Inventors: Andrew Grady Godfrey, Simpsonville, SC (US); Marissa Singley Garcia, Greenville, SC (US); Jun Cai, Greer, SC (US)

(73) Assignee: GE Infrastructure Technology LLC, Greenville, SC (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/975,137

(22) Filed: Oct. 27, 2022

(65) Prior Publication Data

US 2023/0051253 A1 Feb. 16, 2023

Related U.S. Application Data

(63) Continuation of application No. 16/916,446, filed on Jun. 30, 2020, now Pat. No. 11,512,853.

(51) Int. Cl.
*F23R 3/28* (2006.01)

(52) U.S. Cl.
CPC .......... *F23R 3/286* (2013.01); *F05D 2220/31* (2013.01); *F05D 2220/323* (2013.01); *F05D 2240/36* (2013.01); *F23R 3/283* (2013.01)

(58) Field of Classification Search
CPC ........................................................ F23R 3/286
See application file for complete search history.

(56) References Cited

U.S. PATENT DOCUMENTS

| | | | | |
|---|---|---|---|---|
| 6,868,676 | B1 | 3/2005 | Haynes | |
| 6,931,854 | B2 | 8/2005 | Saitoh et al. | |
| 8,333,075 | B2 | 12/2012 | York et al. | |
| 10,502,426 | B2 | 12/2019 | Lemon et al. | |
| 10,690,349 | B2 | 6/2020 | Natarajan et al. | |
| 10,851,999 | B2 | 12/2020 | Cai et al. | |
| 10,865,992 | B2 | 12/2020 | DiCintio et al. | |
| 11,015,809 | B2 | 5/2021 | Stewart | |
| 11,512,853 | B2 * | 11/2022 | Godfrey | F23R 3/286 |

(Continued)

FOREIGN PATENT DOCUMENTS

| | | | |
|---|---|---|---|
| CN | 109579052 | A | 5/2019 |
| JP | 2016/125807 | A1 | 7/2016 |

*Primary Examiner* — Lorne E Meade
(74) *Attorney, Agent, or Firm* — Dority & Manning, P.A.

(57) ABSTRACT

A fuel injector includes a forward end wall and an aft end wall. The fuel injector further includes side walls that extend between the forward end wall and the aft end wall. The forward end wall, the aft end wall, and the side walls collectively define an opening for passage of air. At least one fuel injection member is disposed within the opening and extends between the end walls. A fuel circuit is defined within the fuel injector. The fuel circuit includes an inlet plenum defined within the forward end wall of the fuel injector. The fuel circuit further includes a fuel passage that extends from, and is in fluid communication with, the inlet plenum. The fuel passage is defined within the at least one fuel injection member. The fuel passage has a cross-sectional area that varies along a length of the fuel injection member.

18 Claims, 10 Drawing Sheets

(56) References Cited

U.S. PATENT DOCUMENTS

| | | | |
|---|---|---|---|
| 2003/0089801 | A1 | 5/2003 | Saitoh et al. |
| 2006/0226264 | A1 | 10/2006 | Bacho, III et al. |
| 2010/0170250 | A1 | 7/2010 | Singh et al. |
| 2010/0263383 | A1 | 10/2010 | York et al. |
| 2016/0238255 | A1 | 8/2016 | Ryon et al. |
| 2018/0187893 | A1 | 7/2018 | DiCintio et al. |
| 2018/0187894 | A1 | 7/2018 | Cai et al. |
| 2018/0328588 | A1 | 11/2018 | Lemon et al. |
| 2019/0072279 | A1 | 3/2019 | Natarajan et al. |

* cited by examiner

FUEL CIRCUIT FOR A FUEL INJECTOR

RELATED APPLICATIONS

This application is a continuation application of U.S. Non-Provisional patent application Ser. No. 16/916,446 having a filing date of Jun. 30, 2020, the disclosure of which is incorporated by reference herein in its entirety.

FIELD

The present disclosure relates generally to fuel injectors for gas turbine combustors and, more particularly, to fuel injectors for use with an axial fuel staging (AFS) system associated with such combustors.

BACKGROUND

Turbomachines are utilized in a variety of industries and applications for energy transfer purposes. For example, a gas turbine engine generally includes a compressor section, a combustion section, a turbine section, and an exhaust section. The compressor section progressively increases the pressure of a working fluid entering the gas turbine engine and supplies this compressed working fluid to the combustion section. The compressed working fluid and a fuel (e.g., natural gas) mix within the combustion section and burn in a combustion chamber to generate high pressure and high temperature combustion gases. The combustion gases flow from the combustion section into the turbine section where they expand to produce work. For example, expansion of the combustion gases in the turbine section may rotate a rotor shaft connected, e.g., to a generator to produce electricity. The combustion gases then exit the gas turbine via the exhaust section.

In some combustors, the generation of combustion gases occurs at two, spaced stages. Such combustors are referred to herein as including an "axial fuel staging" (AFS) system, which delivers fuel and an oxidant to one or more fuel injectors downstream of the head end of the combustor. In a combustor with an AFS system, a primary fuel nozzle at an upstream end of the combustor injects fuel and air (or a fuel/air mixture) in an axial direction into a primary combustion zone, and an AFS fuel injector located at a position downstream of the primary fuel nozzle injects fuel and air (or a second fuel/air mixture) as a cross-flow into a secondary combustion zone downstream of the primary combustion zone. The cross-flow is generally transverse to the flow of combustion products from the primary combustion zone. In some cases, it is desirable to introduce the fuel and air into the secondary combustion zone as a mixture. Therefore, the mixing capability of the AFS injector influences the overall operating efficiency and/or emissions of the gas turbine.

Typically, AFS injectors include hollow injection members having multiple fuel outlets that inject fuel to be mixed with air prior to combustion within the secondary combustion zone. However, issues exist with the use of hollow fuel injection members. For example, recirculation of fuel within the hollow injection members and a non-uniform pressure drop of the fuel across each of the many fuel outlets may cause an unequal distribution of fuel within the fuel injector. Both the recirculation and the non-uniform pressure drop within the fuel injection member can result in non-uniform mixing of fuel and air within the fuel injector, which causes a loss in the overall operating efficiency of the gas turbine.

Accordingly, an improved fuel injector, which is capable of uniformly distributing fuel along its entire length, is desired in the art. In particular, a fuel injector that advantageously minimizes recirculation and flow vortices and that equalizes pressure drop along its entire length, which thereby reduces the overall emissions of the gas turbine, is desired.

BRIEF DESCRIPTION

Aspects and advantages of the fuel injectors and combustors in accordance with the present disclosure will be set forth in part in the following description, or may be obvious from the description, or may be learned through practice of the technology.

In accordance with one embodiment, a fuel injector is provided. The fuel injector includes a forward end wall and an aft end wall disposed oppositely from the forward end wall. The fuel injector further includes side walls that extend between the forward end wall and the aft end wall. The forward end wall, the aft end wall, and the side walls collectively define an opening for passage of air. At least one fuel injection member is disposed within the opening and extends between the end walls. A fuel circuit is defined within the fuel injector. The fuel circuit includes an inlet plenum defined within the forward end wall of the fuel injector. The fuel circuit further includes a fuel passage that extends from, and is in fluid communication with, the inlet plenum. The fuel passage is defined within the at least one fuel injection member. The fuel passage has a cross-sectional area that varies along a length of the fuel injection member.

In accordance with another embodiment, a combustor is provided. The combustor includes a head end portion with an end cover and at least one fuel nozzle extending from the end cover. A combustion liner extends between the head end portion and an aft frame and defines a combustion chamber. The combustor further includes a fuel injector disposed downstream from the at least one fuel nozzle and in fluid communication with the combustion chamber. The fuel injector includes a forward end wall and an aft end wall disposed oppositely from the forward end wall. The fuel injector further includes side walls that extend between the forward end wall and the aft end wall. The forward end wall, the aft end wall, and the side walls collectively define an opening for passage of air. At least one fuel injection member is disposed within the opening and extends between the end walls. A fuel circuit is defined within the fuel injector. The fuel circuit includes an inlet plenum defined within the forward end wall of the fuel injector. The fuel circuit further includes a fuel passage that extends from, and is in fluid communication with, the inlet plenum. The fuel passage is defined within the at least one fuel injection member. The fuel passage has a cross-sectional area that varies along a length of the fuel injection member.

These and other features, aspects and advantages of the present fuel injectors and combustors will become better understood with reference to the following description and appended claims. The accompanying drawings, which are incorporated in and constitute a part of this specification, illustrate embodiments of the technology and, together with the description, serve to explain the principles of the technology.

BRIEF DESCRIPTION OF THE DRAWINGS

A full and enabling disclosure of the present fuel injectors and combustors, including the best mode of making and using the present systems and methods, directed to one of ordinary skill in the art, is set forth in the specification, which makes reference to the appended figures, in which.

DETAILED DESCRIPTION

Figure 1:
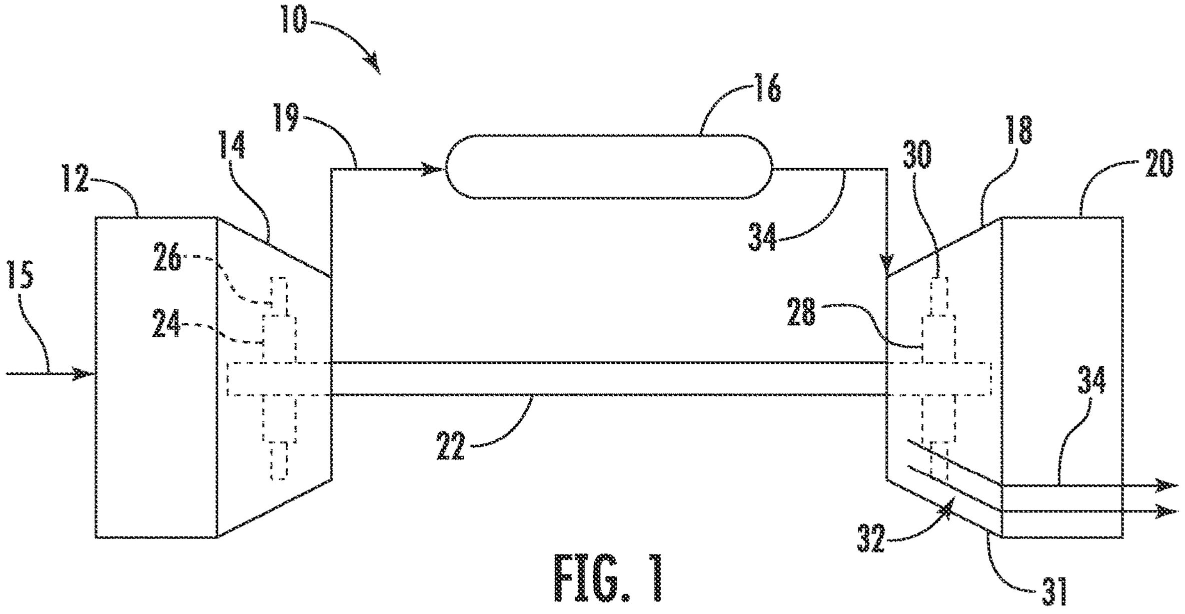
FIG. 1 is a schematic illustration of a turbomachine in accordance with embodiments of the present disclosure.

Reference now will be made in detail to embodiments of the present fuel injectors and combustors, one or more examples of which are illustrated in the drawings. Each example is provided by way of explanation, rather than limitation of, the technology. In fact, it will be apparent to those skilled in the art that modifications and variations can be made in the present technology without departing from the scope or spirit of the claimed technology. For instance, features illustrated or described as part of one embodiment can be used with another embodiment to yield a still further embodiment. Thus, it is intended that the present disclosure covers such modifications and variations as come within the scope of the appended claims and their equivalents.

The detailed description uses numerical and letter designations to refer to features in the drawings. Like or similar designations in the drawings and description have been used to refer to like or similar parts of the invention. As used herein, the terms "first", "second", and "third" may be used interchangeably to distinguish one component from another and are not intended to signify location or importance of the individual components.

As used herein, the terms "upstream" (or "forward") and "downstream" (or "aft") refer to the relative direction with respect to fluid flow in a fluid pathway. For example, "upstream" refers to the direction from which the fluid flows, and "downstream" refers to the direction to which the fluid flows. The term "radially" refers to the relative direction that is substantially perpendicular to an axial centerline of a particular component, the term "axially" refers to the relative direction that is substantially parallel and/or coaxially aligned to an axial centerline of a particular component, and the term "circumferentially" refers to the relative direction that extends around the axial centerline of a particular component.

Terms of approximation, such as "generally," or "about" include values within ten percent greater or less than the stated value. When used in the context of an angle or direction, such terms include within ten degrees greater or less than the stated angle or direction. For example, "generally vertical" includes directions within ten degrees of vertical in any direction, e.g., clockwise or counter-clockwise.

Referring now to the drawings, FIG. 1 illustrates a schematic diagram of one embodiment of a turbomachine, which in the illustrated embodiment is a gas turbine 10. Although an industrial or land-based gas turbine is shown and described herein, the present disclosure is not limited to an industrial or land-based gas turbine, unless otherwise specified in the claims. For example, the invention as described herein may be used in any type of turbomachine including but not limited to a steam turbine, an aircraft gas turbine, or a marine gas turbine.

As shown, gas turbine 10 generally includes an inlet section 12, a compressor section 14 disposed downstream of the inlet section 12, a plurality of combustors 17 (FIG. 2) within a combustor section 16 disposed downstream of the compressor section 14, a turbine section 18 disposed downstream of the combustor section 16, and an exhaust section 20 disposed downstream of the turbine section 18. Additionally, the gas turbine 10 may include one or more shafts 22 coupled between the compressor section 14 and the turbine section 18.

The compressor section 14 may generally include a plurality of rotor disks 24 (one of which is shown) and a plurality of rotor blades 26 extending radially outwardly from and connected to each rotor disk 24. Each rotor disk 24 in turn may be coupled to or form a portion of the shaft 22 that extends through the compressor section 14.

The turbine section 18 may generally include a plurality of rotor disks 28 (one of which is shown) and a plurality of rotor blades 30 extending radially outwardly from and being interconnected to each rotor disk 28. Each rotor disk 28 in turn may be coupled to or form a portion of the shaft 22 that extends through the turbine section 18. The turbine section 18 further includes an outer casing 31 that circumferentially surrounds the portion of the shaft 22 and the rotor blades 30, thereby at least partially defining a hot gas path 32 through the turbine section 18.

During operation, a working fluid such as air 15 flows through the inlet section 12 and into the compressor section 14 where the air 15 is progressively compressed, thus providing pressurized air or compressed air 19 to the combustors of the combustor section 16. The pressurized air is mixed with fuel and burned within each combustor to produce combustion gases 34. The combustion gases 34 flow through the hot gas path 32 from the combustor section 16 into the turbine section 18, wherein energy (kinetic and/or thermal) is transferred from the combustion gases 34 to the rotor blades 30, causing the shaft 22 to rotate. The mechanical rotational energy may then be used to power the compressor section 14 and/or to generate electricity. The combustion gases 34 exiting the turbine section 18 may then be exhausted from the gas turbine 10 via the exhaust section 20.

Figure 2:
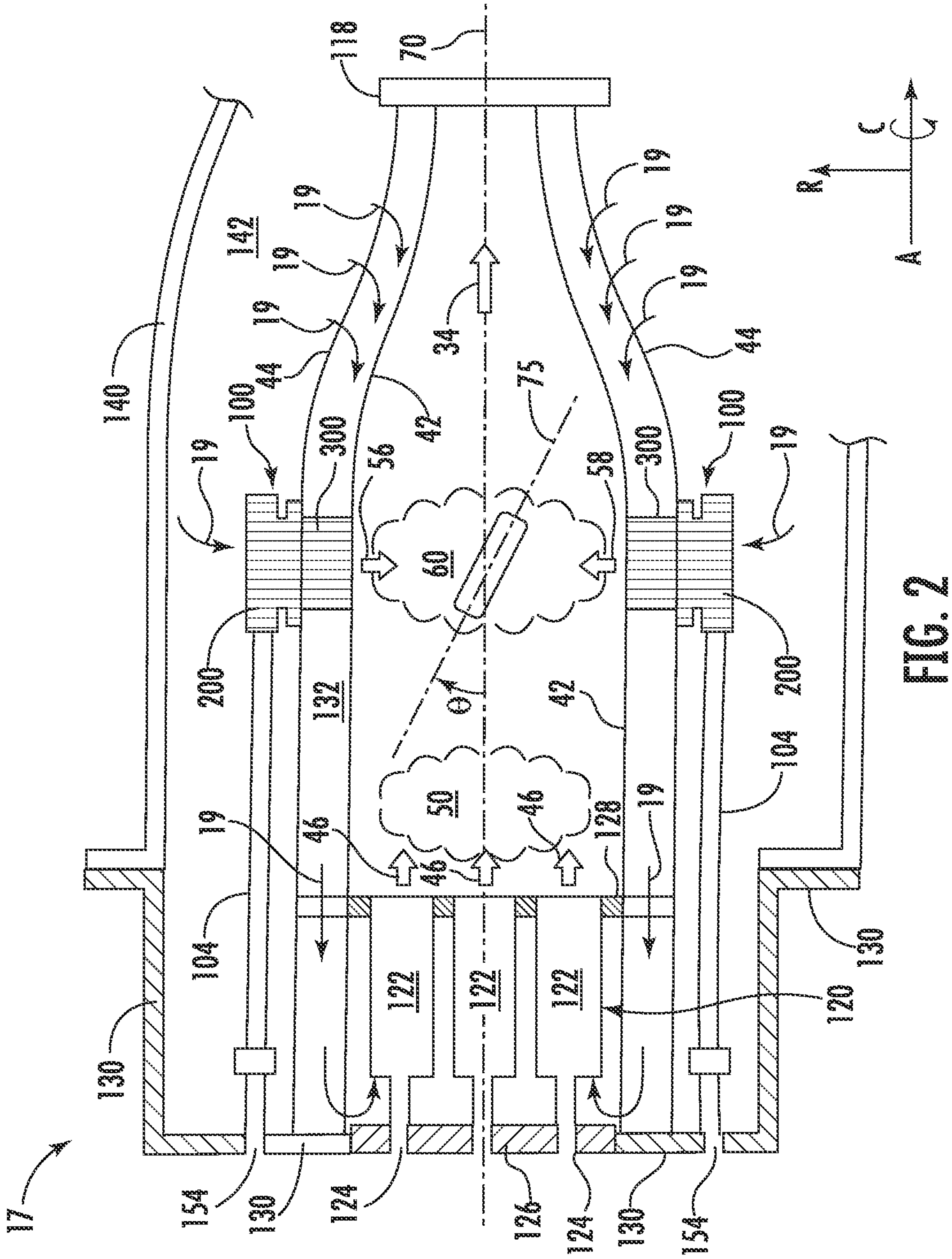
FIG. 2 is a cross-sectional schematic illustration of a combustor in accordance with embodiments of the present disclosure.

FIG. 2 is a schematic representation of a combustor 17, as may be included in a can annular combustion system for a heavy-duty gas turbine. In a can-annular combustion system, a plurality of combustors 17 (e.g., 8, 10, 12, 14, 16, or more) are positioned in an annular array about the shaft 22 that connects the compressor section 14 to the turbine section 18. The turbine section 18 may be operably connected (e.g., by the shaft 22) to a generator (not shown) for producing electrical power.

As shown in FIG. 2, the combustor 17 may define an axial direction A and a circumferential direction C which extends around the axial direction A. The combustor 17 may also define a radial direction R perpendicular to the axial direction A.

In FIG. 2, the combustor 17 includes a combustion liner 42 that contains and conveys combustion gases 34 to the turbine. The combustion liner 42 may have a cylindrical liner portion and a tapered transition portion that is separate from the cylindrical liner portion, as in many conventional combustion systems. Alternately, the combustion liner 42 may have a unified body (or "unibody") construction, in which the cylindrical portion and the tapered portion are integrated with one another. Thus, any discussion of the combustion liner 42 herein is intended to encompass both conventional combustion systems having a separate liner and transition piece and those combustion systems having a unibody liner. Moreover, the present disclosure is equally applicable to those combustion systems in which the transition piece and the stage one nozzle of the turbine are integrated into a single unit, sometimes referred to as a "transition nozzle" or an "integrated exit piece."

The combustion liner 42 is surrounded by an outer sleeve 44, which is spaced radially outward of the combustion liner 42 to define a cooling flow annulus 132 between the combustion liner 42 and the outer sleeve 44. The outer sleeve 44 may include a flow sleeve portion at the forward end and an impingement sleeve portion at the aft end, as in many conventional combustion systems. Alternately, the outer sleeve 44 may have a unified body (or "unisleeve") construction, in which the flow sleeve portion and the impingement sleeve portion are integrated with one another in the axial direction A. As before, any discussion of the outer sleeve 44 herein is intended to encompass both conventional combustion systems having a separate flow sleeve and impingement sleeve and combustion systems having a unisleeve outer sleeve.

A head end portion 120 of the combustor 17 includes one or more fuel nozzles 122 extending from an end cover 126 at a forward end of the combustor 17. The fuel nozzles 122 have a fuel inlet 124 at an upstream (or inlet) end. The fuel inlets 124 may be formed through the end cover 126. The downstream (or outlet) ends of the fuel nozzles 122 extend through a combustor cap 128.

The head end portion 120 of the combustor 17 is at least partially surrounded by a forward casing 130, which is physically coupled and fluidly connected to a compressor discharge case 140. The compressor discharge case 140 is fluidly connected to an outlet of the compressor section 14 (shown in FIG. 1) and defines a pressurized air plenum 142 that surrounds at least a portion of the combustor 17. Compressed air 19 flows from the compressor discharge case 140 into the cooling flow annulus 132 through holes in the outer sleeve 44 near an aft end 118 of the combustor 17. Because the cooling flow annulus 132 is fluidly coupled to the head end portion 120, the compressed air 19 travels upstream from near the aft end 118 of the combustor 17 to the head end portion 120, where the compressed air 19 reverses direction and enters the fuel nozzles 122.

The fuel nozzles 122 introduce fuel and air, as a primary fuel/air mixture 46, into a primary combustion zone 50 at a forward end of the combustion liner 42, where the fuel and air are combusted. In one embodiment, the fuel and air are mixed within the fuel nozzles 122 (e.g., in a premixed fuel nozzle). In other embodiments, the fuel and air may be separately introduced into the primary combustion zone 50 and mixed within the primary combustion zone 50 (e.g., as may occur with a diffusion nozzle). Reference made herein to a "first fuel/air mixture" should be interpreted as describing both a premixed fuel/air mixture and a diffusion-type fuel/air mixture, either of which may be produced by fuel nozzles 122.

The combustion gases from the primary combustion zone 50 travel downstream toward an aft end 118 of the combustor 17. One or more fuel injectors 100 introduce fuel and air, as a secondary fuel/air mixture 56, into a secondary combustion zone 60, where the fuel and air are ignited by the primary zone combustion gases to form a combined combustion gas product stream 34. Such a combustion system having axially separated combustion zones within a single combustor 17 is described as an "axial fuel staging" (AFS) system, and the injector assemblies 100 may be referred to herein as "AFS injectors."

In the embodiment shown, fuel for each injector assembly 100 is supplied from the head end of the combustor 17, via a fuel inlet 154. Each fuel inlet 154 is coupled to a fuel supply line 104, which is coupled to a respective injector assembly 100. It should be understood that other methods of delivering fuel to the injector assemblies 100 may be employed, including supplying fuel from a ring manifold or from radially oriented fuel supply lines that extend through the compressor discharge case 140.

FIG. 2 further shows that the injector assemblies 100 may be oriented at an angle θ (theta) relative to the center line 70 of the combustor 17. In the embodiment shown, the leading edge portion of the injector 100 (that is, the portion of the injector 100 located most closely to the head end) is oriented away from the center line 70 of the combustor 17, while the trailing edge portion of the injector 100 is oriented toward the center line 70 of the combustor 10. The angle θ, defined between the longitudinal axis 75 of the injector 100 and the center line 70, may be between 0 degrees and ±90 degrees, between 0 degrees and ±80 degrees, between 0 degrees and ±70 degrees, between 0 degrees and ±60 degrees, between 0 degrees and ±50 degrees, between 0 degrees and ±40 degrees, between 0 degrees and ±30 degrees, between 0 degrees and ±20 degrees, or between 0 degrees and ±10 degrees or any intermediate value therebetween.

FIG. 2 illustrates the orientation of the injector assembly 100 at a positive angle relative to the center line 70 of the combustor. In other embodiments (not separately illustrated), it may be desirable to orient the injector 100 at a negative angle relative to the center line 70, such that the leading edge portion is proximate the center line 70, and the trailing edge portion is distal to the center line 70. In one embodiment, all the injector assemblies 100 for a combustor 17, if disposed at a non-zero angle, are oriented at the same angle (that is, all are oriented at the same positive angle, or all are oriented at the same negative angle).

The injector assemblies 100 inject the second fuel/air mixture 56 into the combustion liner 42 in a direction transverse to the center line 70 and/or the flow of combustion products from the primary combustion zone, thereby forming the secondary combustion zone 60. The combined combustion gases 34 from the primary and secondary combustion zones travel downstream through the aft end 118 of the combustor can 17 and into the turbine section 18 (FIG. 1), where the combustion gases 34 are expanded to drive the turbine section 18.

Notably, to enhance the operating efficiency of the gas turbine 10 and to reduce emissions, it is desirable for the injector 100 to thoroughly mix fuel and compressed gas to form the second fuel/air mixture 56. Thus, the injector embodiments described below facilitate improved mixing. Additionally, because the fuel injectors 100 include a large number of fuel injection ports, as described further below, the ability to introduce fuels having a wide range of heat release values is increased, providing greater fuel flexibility for the gas turbine operator.

Figure 3:
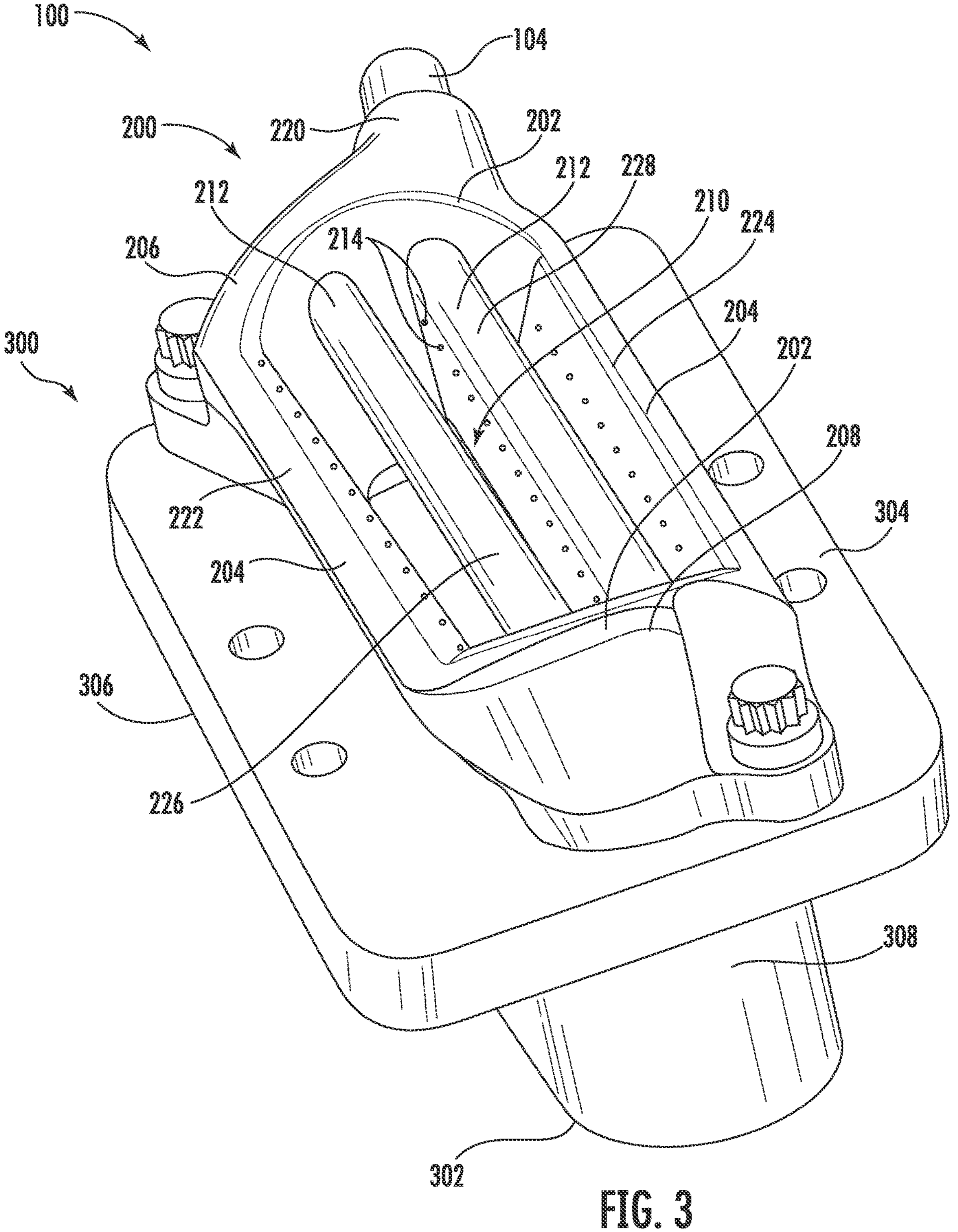
FIG. 3 illustrates a perspective view of a fuel injection assembly detached from a combustor in accordance with embodiments of the present disclosure.

FIG. 3 illustrates an exemplary fuel injector assembly 100 in accordance with embodiments of the present disclosure. As shown, the injector assembly 100 may include a fuel injector 200 and a boss 300. Although the fuel injector 200 and the boss 300 are shown in FIG. 3 as being two separate components coupled together, in many embodiments, the fuel injector 200 and the boss 300 may be a single integrally formed component.

Figure 5:
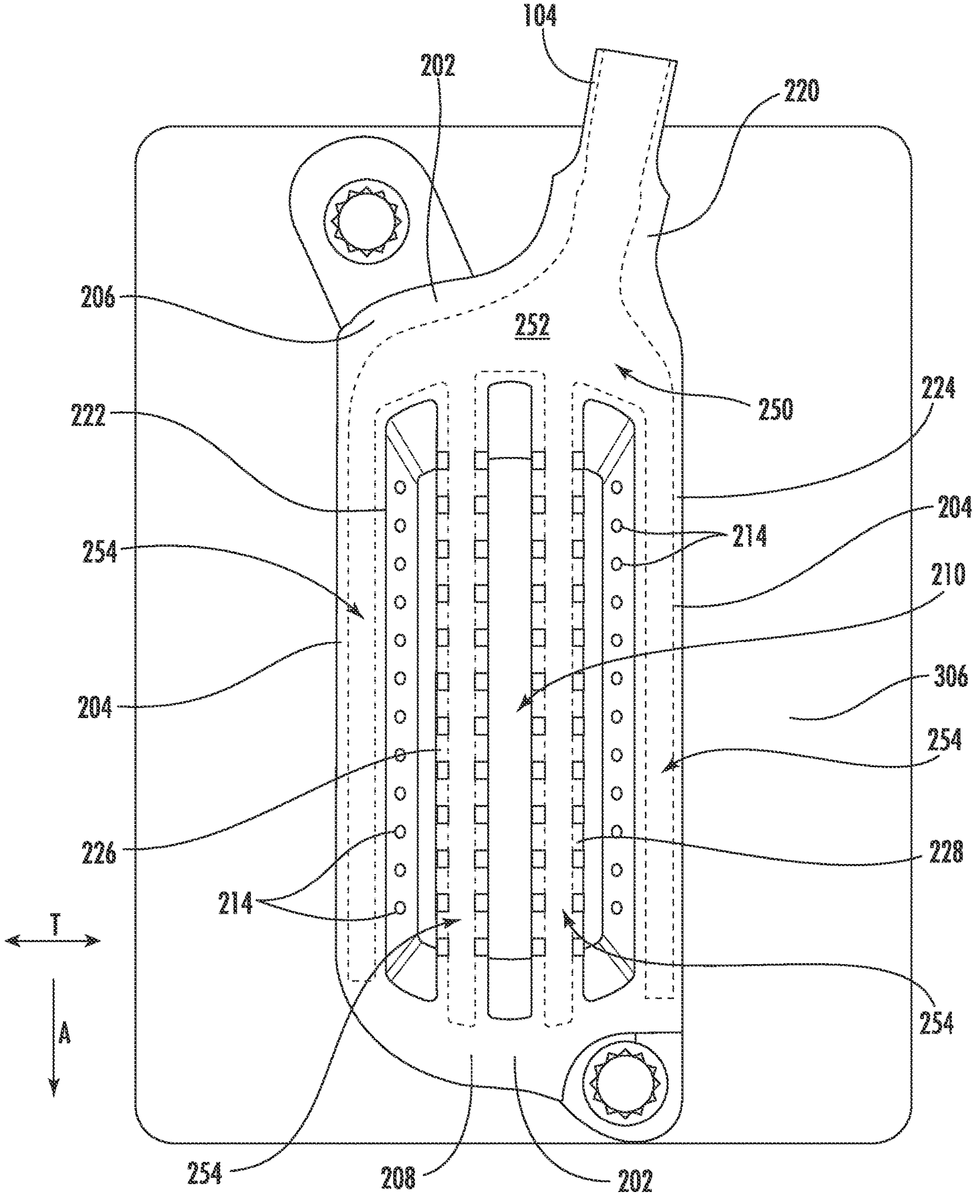
FIG. 5 illustrates a partial cross-sectional plan view of a fuel injection assembly in accordance with embodiments of the present disclosure.

As shown, the fuel injector 200 includes end walls 202 spaced apart from one another and side walls 204 extending between the end walls 202. In many embodiments, when installed in a combustor 17, the side walls 204 of the fuel injector 200 may extend parallel to the axial direction A (FIG. 5). The end walls 202 of the fuel injector 200 include a first or forward end wall 206 and a second or aft end wall 208 disposed oppositely from one another. The side walls 204 may be spaced apart from one another and may extend between the forward end wall 206 and the aft end wall 208.

Figure 9:
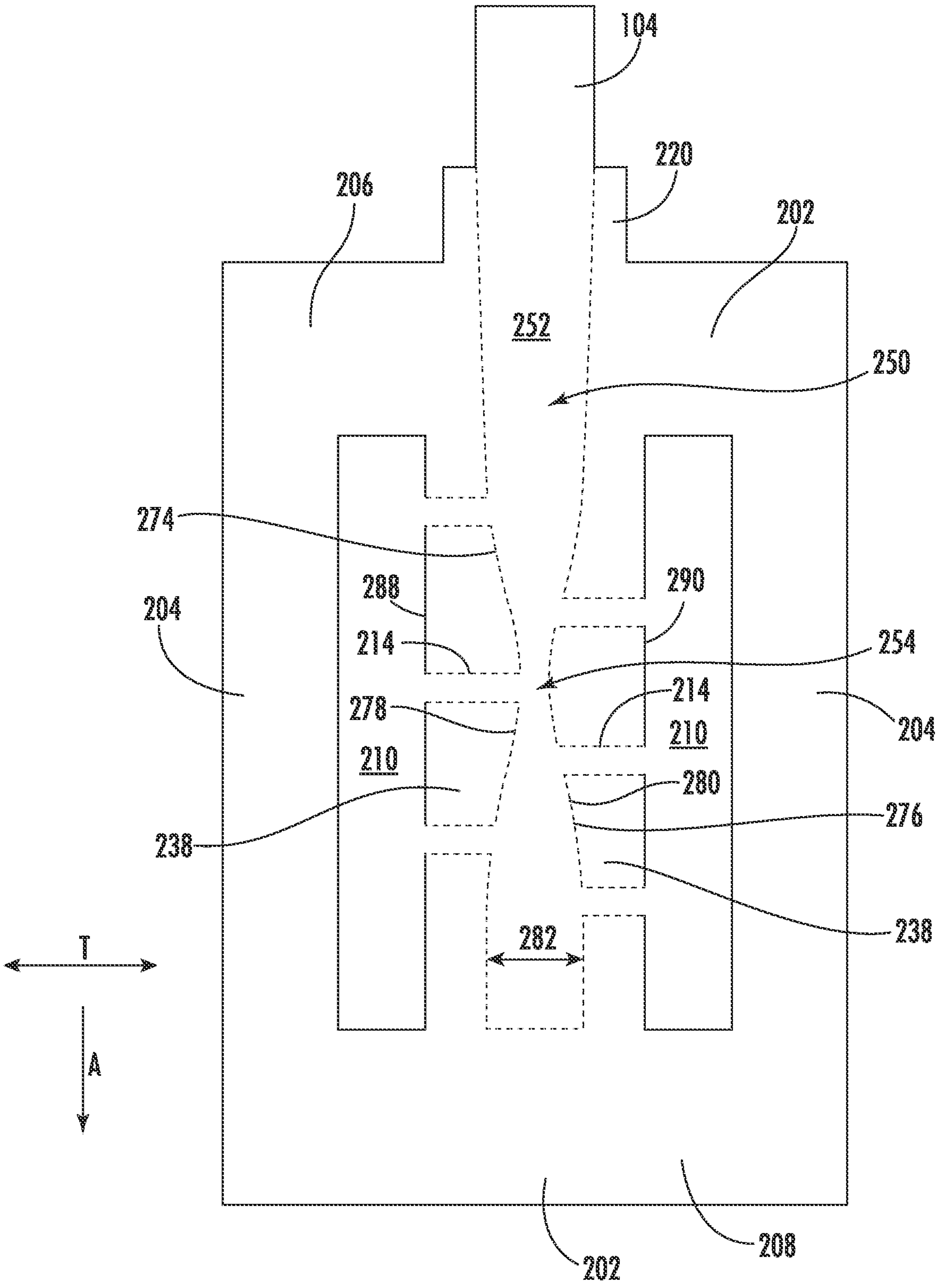
FIG. 9 illustrates a cross-sectional plan view of a fuel injector in accordance with embodiments of the present disclosure.
Figure 10:
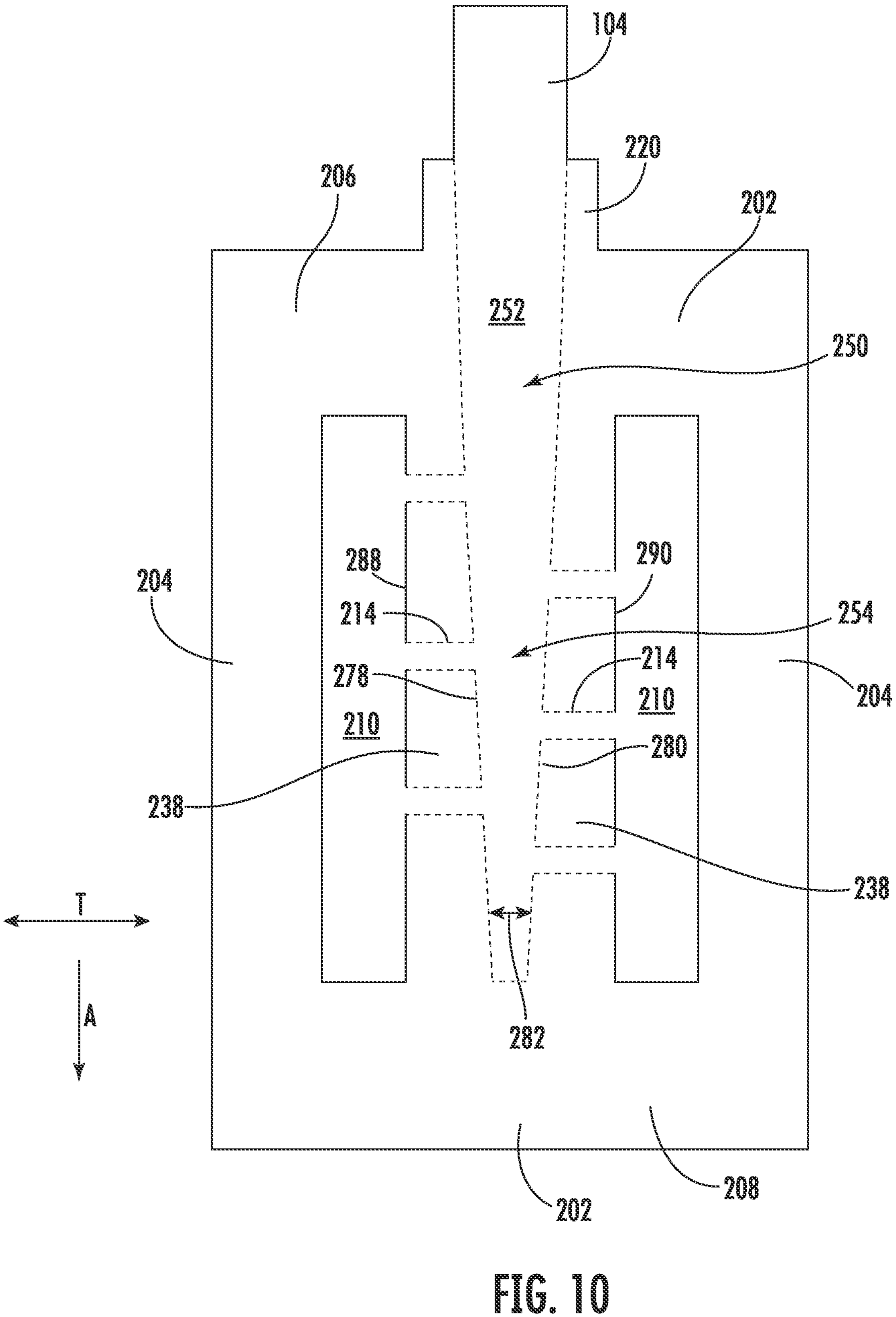
FIG. 10 illustrates a cross-sectional plan view of a fuel injector in accordance with embodiments of the present disclosure.

In many embodiments, both the forward end wall 206 and the aft end wall 208 are be arcuate and have a generally rounded cross-sectional shape, and the side walls may extend generally straight between the end walls 202, such that the end walls 202 and the side walls 204 collectively define a first opening 210 having a cross section shaped as a geometric stadium. In various embodiments, the side walls 204 may be longer than the end walls 204 such that the opening 210 is the longest in the axial direction A when attached to the combustor 17. In some embodiments, as shown, the end walls 202 and the side walls 204 may collectively define a geometric stadium shaped area, i.e. a rectangle having rounded ends, that outlines and defines a perimeter of the first opening 210. In other embodiments (as shown in FIGS. 9 and 10), the end walls 202 may be straight such that the end walls 202 and the side walls 204 collectively define a rectangular shaped area.

In many embodiments, the first opening 210 may function to provide a path for compressed air 19 from the pressurized air plenum 142 to travel through and be mixed with fuel prior to reaching the secondary combustion zone 60. As shown in FIG. 3, the fuel injector 200 may further include at least one fuel injection member 212, which may be disposed within the first opening 210 and extend between the end walls 202. In exemplary embodiments, the fuel injection member(s) 212 may extend axially between the end walls 202. The fuel injection members 212 may be substantially hollow bodies that function to provide fuel to the first opening 210 via a plurality of fuel ports 214 defined through the fuel injection members 212. Each fuel injection member 212 may extend from a first end located at the forward end wall 206 to a second end positioned at the aft end wall 208. In many embodiments, the fuel injection members 212 may extend straight, i.e., without a sudden change in direction, from the forward end wall 206 to the aft end wall 208 in the axial direction A.

In the embodiment shown in FIG. 3, the fuel injector is shown as having two fuel injection members 212 spaced apart from one another within the opening 210. However, the fuel injector 200 may have any number of fuel injection members 212 disposed within the first opening 210 (e.g. 1, 3, 4, 5, 6, or more), and the present disclosure is not limited to any particular number of fuel injection members 212, unless specifically recited in the claims.

As shown in FIG. 3, the fuel injector 200 further includes a conduit fitting 220 that is integrally formed with the forward end wall 206. The conduit fitting 220 may be fluidly coupled to the fuel supply line 104, such that it functions to receive a flow of fuel from the fuel supply line 104. The conduit fitting 220 may then distribute fuel to each of the fuel injection members 212 and/or the side wall fuel injection members 222, 224 (FIG. 4) to be ejected into the first opening 210 and mixed with the compressed air 19. The conduit fitting 220 may have any suitable size and shape, and may be formed integrally with, or coupled to, any suitable portion(s) of the fuel injector 200 that enables the conduit fitting 220 to function as described herein.

In many embodiments, the entire fuel injector 200 may be integrally formed as a single component. That is, each of the subcomponents, e.g., the end walls 202, the side walls 204, the fuel injection members 212, and any other subcomponent of the fuel injector 200, may be manufactured together as a single body. In exemplary embodiments, the single body of the fuel injector 200 may be produced by utilizing an additive manufacturing method, such as 3D printing. In this regard, utilizing additive manufacturing methods, the fuel injector 200 may be integrally formed as a single piece of continuous metal and may thus include fewer sub-components and/or joints compared to prior designs. The integral formation of the fuel injector 200 through additive manufacturing may advantageously improve the overall assembly process. For example, the integral formation reduces the number of separate parts that must be assembled, thus reducing associated time and overall assembly costs. Additionally, existing issues with, for example, leakage, joint quality between separate parts, and overall performance may advantageously be reduced. In other embodiments, manufacturing techniques, such as casting or other suitable techniques, may be used.

Figure 4:
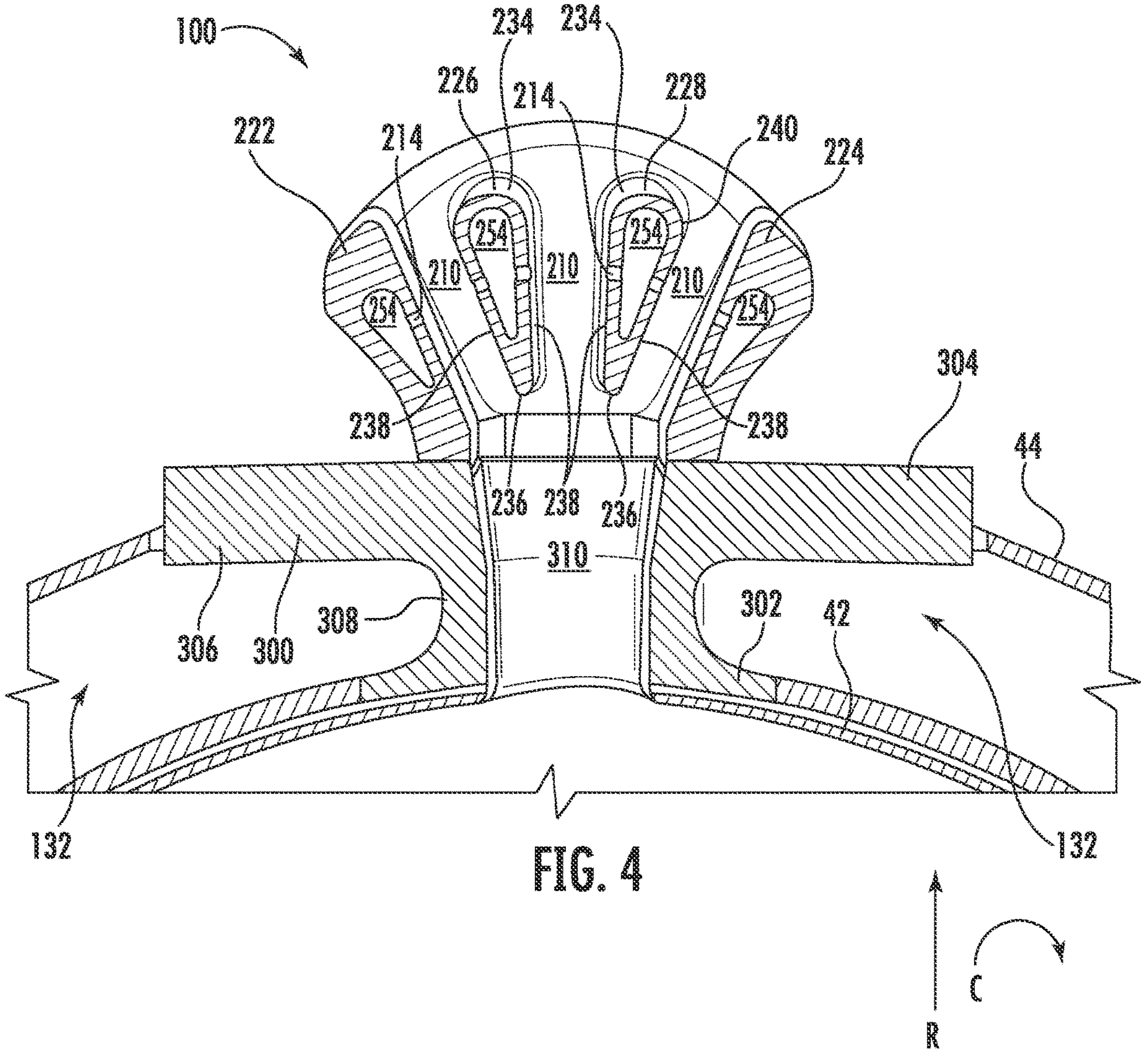
FIG. 4 illustrates a cross-sectional plan view of a fuel injection assembly attached to a combustor in accordance with embodiments of the present disclosure.

As shown in FIG. 3, the fuel injector assembly 100 may further include a boss 300. As shown in FIGS. 4 and 5, the boss 300 may be fixedly coupled to the combustion liner 42 at a first end 302 and may extend radially through the cooling flow annulus 132 to a flange portion 306 disposed at a second end 304. The flange portion 306 may be substantially flat and planar, such that it provides a smooth surface for the fuel injector 200 to be sealingly coupled thereto, which minimizes the likelihood of fuel/air leaks during operation of the gas turbine 10. In many embodiments, the boss 300 may include a jacket portion 308 that extends between the first end 302 and the flange portion 306.

The boss 300 may define a second opening 310 that aligns with the first opening 210 and that creates a path for fuel and air to be introduced into secondary combustion zone 60 (FIG. 4). For example, in some embodiments, the second opening 310 and the first opening 210 may share a common center axis (FIGS. 4 and 5). In this arrangement, the boss 300 provides for fluid communication between the fuel injector 200 and the secondary combustion zone 60. More specifically, the second opening 310 may be defined by the flange portion 306 and the jacket portion 308 of the boss 300 and may be shaped as a geometric stadium, i.e., a rectangle having semi-circular ends.

In many embodiments, the size of the second opening 310 may vary between fuel injection assemblies 100 on the combustor 17. For example, because the second opening 310 functions at least partially to meter the flow of air and fuel being introduced to the secondary combustion zone 60, it may be advantageous in some embodiments to have more/less air and fuel be introduced through one or more of the fuel injection assemblies 100 on the combustor 17. This differential metering may be accomplished by altering the size of the second opening 310 of at least one fuel injector assembly 100 relative to at least one other fuel injector assembly 100, depending on the desired volume of air and fuel to be introduced to the secondary combustion zone 60 at a given circumferential position.

FIG. 4 illustrates a cross-sectional view of the fuel injection assembly 100 coupled to the combustor 17. As shown in FIG. 4, the jacket portion 308 extends from the flange 306, through the cooling flow annulus 132, to the combustion liner 42. In many embodiments, the jacket portion 308 creates an impediment to the flow of compressed air 19 through the cooling flow annulus 132 (FIG. 4). However, as shown in FIG. 3, the jacket portion 306 is shaped as a geometric stadium having its major axis parallel, or substantially parallel, to the direction of the compressed air 19 flow. This advantageously produces a smaller compressed air 19 blockage in the cooling flow annulus 132 than, for example, a jacket portion having a round shape, while still providing an adequate area for fuel and air to be introduced through the second opening 310 and entrained into the secondary combustion zone 60.

In many embodiments, as shown, the side walls 204 may include a first fuel injection member 222 and a second fuel injection member 224. For example, the first and second fuel injection members 222, 224 may be integrally formed within the side walls 204, such that they function both to partially define the first opening 210 and to inject fuel through the plurality of fuel ports 210 for mixing within the fuel injector 200. In various embodiments, as shown, the fuel injection members 212 may include a third fuel injection member 226 and a fourth fuel injection member 228 positioned between the first and second fuel injection members 222, 224 defined in the side walls 204.

In embodiments having four fuel injection members, there may be six injection planes within the fuel injector 200. For example, a single row of fuel ports 214 may be defined on each of the side wall fuel injection members 222, 224, which provides for two of the fuel injection planes. Four more fuel injection planes may be disposed on the centrally located fuel injection members 226, 228. For example, each fuel injection member 226, 228 may have a single row of fuel ports 214 disposed on either side of the fuel injection members 226, 228, which provides four fuel injection planes. In some embodiments, the first fuel injection member 222 and the second fuel injection member 224 may converge towards one another as they extend radially inward. In this way, the entire geometric stadium area defined by the end walls 202 and the side walls 204 gradually reduces from a radially outer surface to a radially inner surface of the fuel injector 200.

Figure 6:
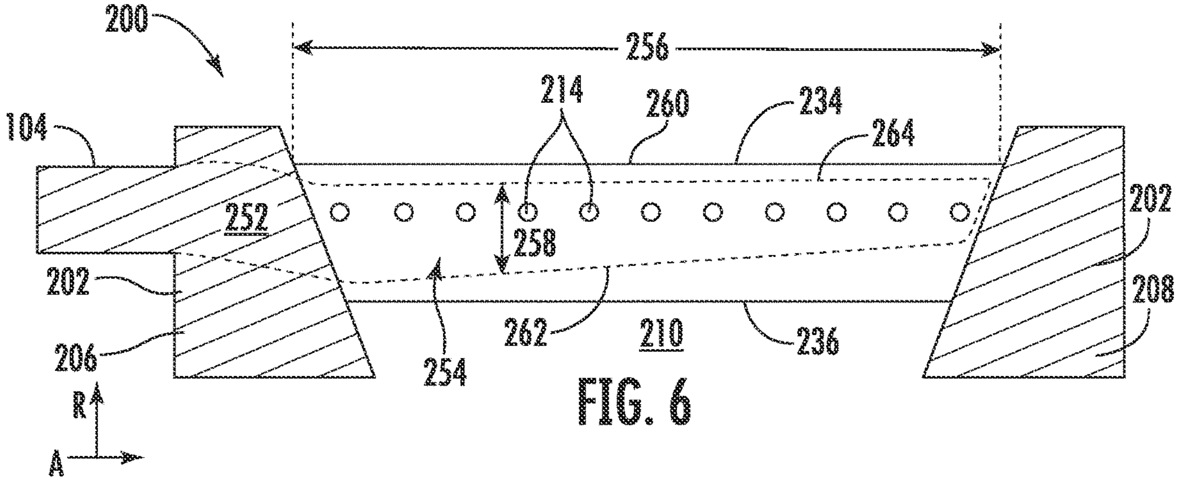
FIG. 6 illustrates a cross-sectional side view of a fuel injector in accordance with embodiments of the present disclosure.

As shown in FIG. 4, the fuel injection members 226, 228 may each have an exterior cross-sectional profile 240 defining a teardrop shape. As shown, the teardrop shape is characterized as having a leading edge 234, a trailing edge 236 opposite the leading edge 234, and walls 238. The walls 238 may extend between the leading edge 234 and the trailing edge 236. In many embodiments, the walls 238 of each fuel injection member 226, 228 define the plurality of fuel injection ports 214. In at least one embodiment, the fuel injection ports 214 may be disposed in a single row (FIG. 6). Although the fuel injection members 226, 228 are shown in FIG. 4 as having an exterior cross-sectional profile 240 that defines a teardrop shape, the fuel injection members 226, 228 may each have an exterior cross-sectional profile defining any one of a circular shape, triangular shape, diamond shape, rectangular shape, or any other suitable cross sectional shape.

As shown in FIGS. 3-5 collectively, the exterior cross-sectional profile 240 of the fuel injection members 226, 228 may be uniform in the axial direction A, such that there is no sudden change in shape or orientation as they extend in the axial direction A from the forward end wall 206 to the aft end wall 208. In this way, although the interior profile may vary along the axial direction A, as shown in FIGS. 6-8, the exterior cross-sectional profile 240 may be uniform in the axial direction A.

FIG. 5 illustrates a partial cross-sectional plan view of the fuel injection assembly 100. As shown, the fuel injector 200 may further include a fuel circuit 250 defined therein. As shown, the fuel circuit 250 may be fluidly coupled to the fuel supply line 104 via the conduit fitting 220. In many embodiments, the fuel circuit 250 includes inlet plenum 252 defined within the forward end wall 206 of the fuel injector 200. The inlet plenum 252 may receive fuel from the fuel supply line 104 and distribute it to one or more fuel passages 254 defined within the side wall fuel injection members 222, 224 and/or the fuel injection members 226, 228. In some embodiments, as shown in FIG. 5, each of the fuel passages 254 may extend directly from the inlet fuel plenum 252, along the axial direction A, to the aft end wall 208. In many embodiments, each of the fuel passages 254 may be parallel to one another.

As shown in FIG. 5, the plurality of fuel ports 214 may be defined on the side wall fuel injection members 222, 224 and/or the fuel injection members 226, 228 and may be in fluid communication with the respective fuel passages 254, in order to provide fuel to the first opening 210 to be mixed with compressed air 19 before entering the secondary combustion zone 60. For example, in many embodiments, each fuel port 214 of the plurality of fuel ports 214 may extend between a respective fuel passage 254 and the opening 210.

Figure 7:
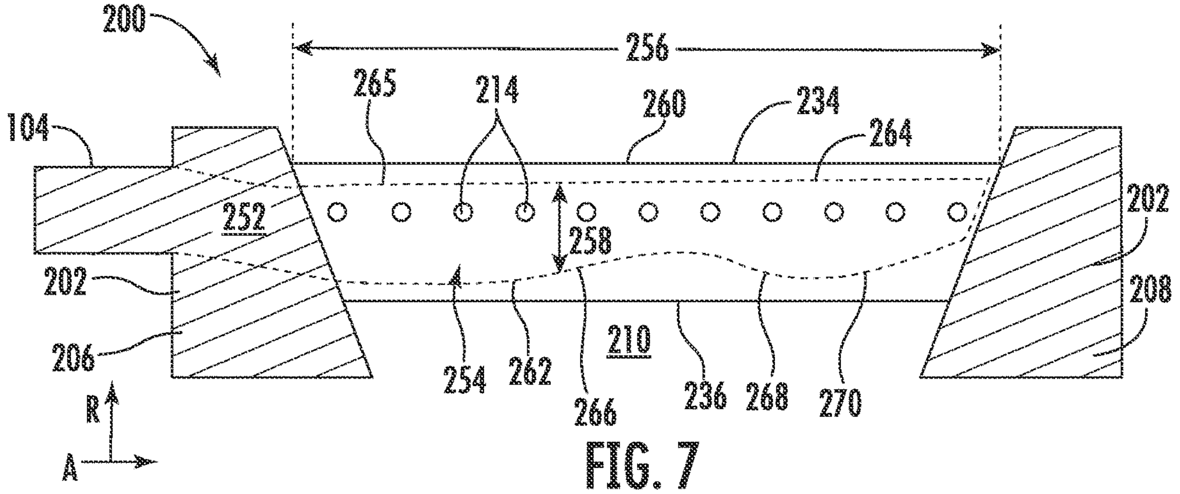
FIG. 7 illustrates a cross-sectional side view of a fuel injector in accordance with embodiments of the present disclosure.
Figure 8:
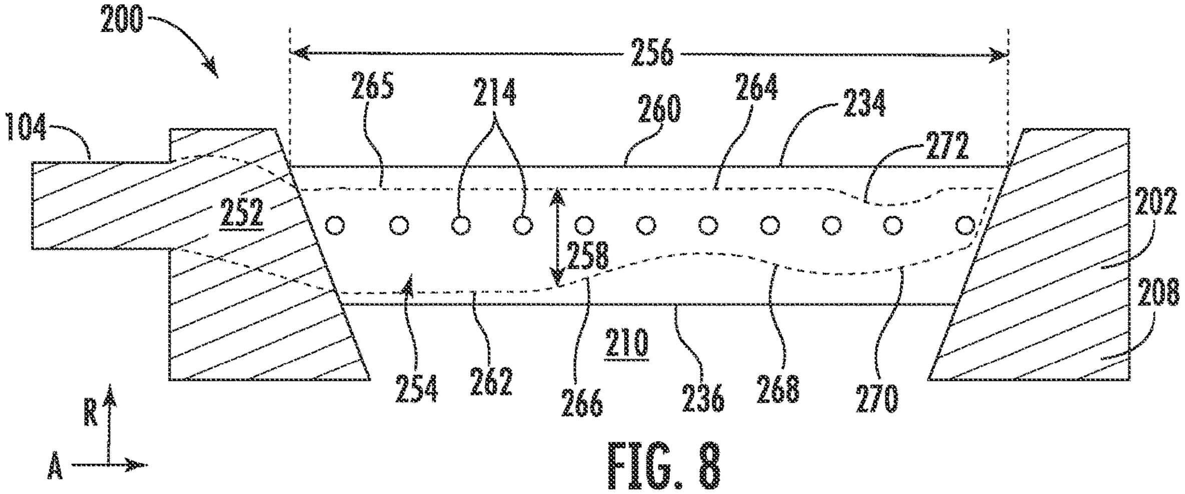
FIG. 8 illustrates a cross-sectional side view of a fuel injector in accordance with embodiments of the present disclosure.

FIGS. 6-8 illustrate cross-sectional side views of a fuel injector 200, showing a fuel injection member 260, in accordance with embodiments of the present disclosure. The fuel injection member 260 shown in FIGS. 6-8 may be representative of either or both of the side wall fuel injection members 222, 224 and/or the fuel injection members 226, 228 discussed herein. As shown, the injection member 260 is disposed within the first opening 210 and extends axially between the end walls 202.

As discussed herein, the fuel injector 200 may further define a fuel circuit 250 having an inlet plenum 252 and a fuel passage 254. In many embodiments, the inlet plenum 252 may be defined within the forward end wall 206 of the fuel injector 200. The fuel passage 254 and may extend directly from the inlet plenum 252, within the fuel injection member 260, and terminate proximate the aft end wall 208. In many embodiments, fuel from the inlet fuel plenum 252 may flow into the fuel passage 254 to be injected into the opening 210 via the plurality of fuel ports 214 disposed along the fuel injection member 260. In some embodiments, the fuel passage 254 may terminate within the aft end wall 208. In other embodiments, the fuel passage 254 may terminate forward of the aft end wall 208.

In many embodiments, the fuel passage 254 may have a cross-sectional area that varies along an axial length 256 of the fuel injection member 260. Specifically, as shown, the radial height 258, i.e., width of the fuel passage 254 measured in the radial direction, may vary as the passage extends along the length in the axial direction A, which thereby reduces the overall cross-sectional area of the fuel passage 254. In some embodiments, the fuel passage 260 may include radially inner edge 262 and a radially outer edge 264, which respectively define the radially inner and radially outer flow boundaries of the fuel passage 254.

In the embodiment shown in FIG. 6, the radially outer edge 264 may be a straight line that is generally parallel to the leading edge 234 of the fuel injection member 260 along the axial direction A. The radially inner edge 262 of the flow passage 254 may gradually taper towards the radially outer edge 264 as the passage extends in the axial direction A. In other words, the radially inner edge 262 be a straight edge (no curves) that is sloped towards the radially outer edge 264 such that it gradually and continuously converges towards the radially outer edge 264 as it extends in the axial direction A. In this arrangement, the radial height 258 may decrease at a constant rate as the flow passage 254 extends in the axial direction A from the forward end wall 206 to the aft end wall 208.

In the embodiment shown in FIG. 6, the radially inner edge 262 is shown as including a taper, and the radially outer 264 edge is shown as being parallel to the leading edge 234. In other embodiments (not shown), the radially outer edge 264 may include the taper and the radially inner edge 262 may be parallel to the leading edge 234.

As shown in FIG. 7, the fuel passage 254 may include straight portion 265, a first converging portion 266, a diverging portion 268, and a second converging portion 270 along the radial direction R. The straight portion 265 of the fuel passage 254 may extend from the inlet plenum 252 to the first converging portion 266, and the diverging portion 268 may extend from the first converging portion 266 to the second converging portion 270. As shown in FIG. 7, the straight portion may be a segment of the fuel passage 252, in which the cross-sectional area is uniform, i.e., constant or unchanging, as the fuel passage 254 extends in the radial direction A. The converging portions 266, 270 of the fuel passage 254 may be segments of the fuel passage 254 in which the cross-sectional area decreases as the fuel passage 254 extends along the axial direction A. Conversely, the diverging portion 268 may be a segment of the fuel passage in which the cross-sectional area of the passage increases as the fuel passage 254 extends along the axial direction A.

As shown in FIG. 7, the radially outer edge 264 may be a straight line that is generally parallel to the leading edge 234 of the fuel injection member 260 along the entire axial length 256 of the fuel injection member 260. As shown, in the straight portion 265, the radially outer edge 264 and the radially inner edge 262 may be parallel to one another such that the radial height 258 is constant along the entire straight portion 265. In the converging portions 266, 270 of the fuel passage 254, the radially inner edge 262 may be arcuate and may converge towards the radially outer edge 264 as the fuel passage extends in the axial direction A, thereby causing the radial height 258 and the overall cross-sectional area of the fuel passage 254 to decrease along the axial direction A. Conversely, in the diverging portion 268 of the fuel passage 254, the radially inner edge 262 may be arcuate and may diverge away from the radially outer edge 264, thereby causing the radial height 258 and the overall cross-sectional area of the fuel passage 254 to increase along the axial direction A.

As shown in FIG. 8, the radially outer edge 264 may include a curved portion 272. As shown, the curved portion 272 of the radially outer edge 272 may be arcuate and may converge towards, then diverge away from, the radially inner edge 262 as the fuel passage 254 extends in the axial direction A, thereby causing the radial height 258 and the overall cross-sectional area of the fuel passage 254 to vary along the axial direction A. In many embodiments, as shown, the curved portion 272 may have a generally parabolic or "U" like shape. The curved portion may function to advantageously reduce flow separation, recirculation, and flow vortices that may otherwise occur if the fuel passage 254 were entirely straight.

In the embodiments shown in FIGS. 6-8, the radially inner edge 262 is shown as tapering and/or being curved along the axial direction A, while the radially outer edge is generally straight or having a substantial portion that is generally straight. However, in other embodiments (not shown), the edge profiles may be switched, such that the radially inner edge 262 may be straight or mostly straight while the radially outer edge 264 curves along the axial direction A.

As shown in FIGS. 6-8, and as discussed herein, the fuel passage 254 may be defined within the fuel injection member 260 and may have a cross section that varies in the axial direction A. However, the exterior cross-sectional profile 240, which in some embodiments may be shaped as a teardrop, may be constant, uniform, and/or unchanging as the fuel injector 260 extends in the axial direction. Advancements in manufacturing methods, such as the additive manufacturing methods discussed herein, allow for an intricate and varying fuel passage 254 within the fuel injection 260 member while maintaining a constant exterior cross-sectional profile 240 important for uniform air flow between the fuel injection members 260.

FIGS. 9-12 illustrate plan views of a fuel injector 200, as viewed from radially outward of the fuel injector 200 along the radial direction R, in accordance with embodiments of the present disclosure. As shown, the fuel injector 200 only includes a single fuel injection member 260. It will be appreciated that the features of fuel injection member 260 shown in FIGS. 9-12 can be incorporated into any of the fuel injection members described herein, such as the side wall fuel injection members 222, 224 and/or the fuel injection members 226, 228. As shown in FIGS. 9-12, the fuel injector 200 may include a transverse direction T that is tangential to the circumferential direction C of the combustor and perpendicular to both the radial direction R and the axial direction A.

In the embodiment shown in FIG. 9, the fuel passage 254 may also include a converging portion 274 and diverging portion 276 along the transverse direction T. As shown, the oppositely disposed walls 238 of the fuel injection member 260 may include oppositely disposed interior surfaces 278, 280, which form the flow boundary in the transverse direction T for the fuel traveling through the fuel passage 254. In the converging portions 274 of the fuel passage 254, the interior surfaces 278, 280 may be arcuate and may converge towards one another as the fuel passage 254 extends in the axial direction A, thereby causing a transverse length 282 and the overall cross-sectional area of the fuel passage 254 to decrease along the axial direction A.

Conversely, in the diverging portion 276, the interior surfaces 278, 280 may be arcuate and may diverge away from one another as the fuel passage 254 extends in the axial direction A, thereby causing a transverse length 282 and the overall cross-sectional area of the fuel passage 254 to increase along the axial direction A. Varying the transverse length 282 in the fuel passage 254 may advantageously reduce flow separation, recirculation, and flow vortices of the fuel within the fuel passage.

Figure 11:
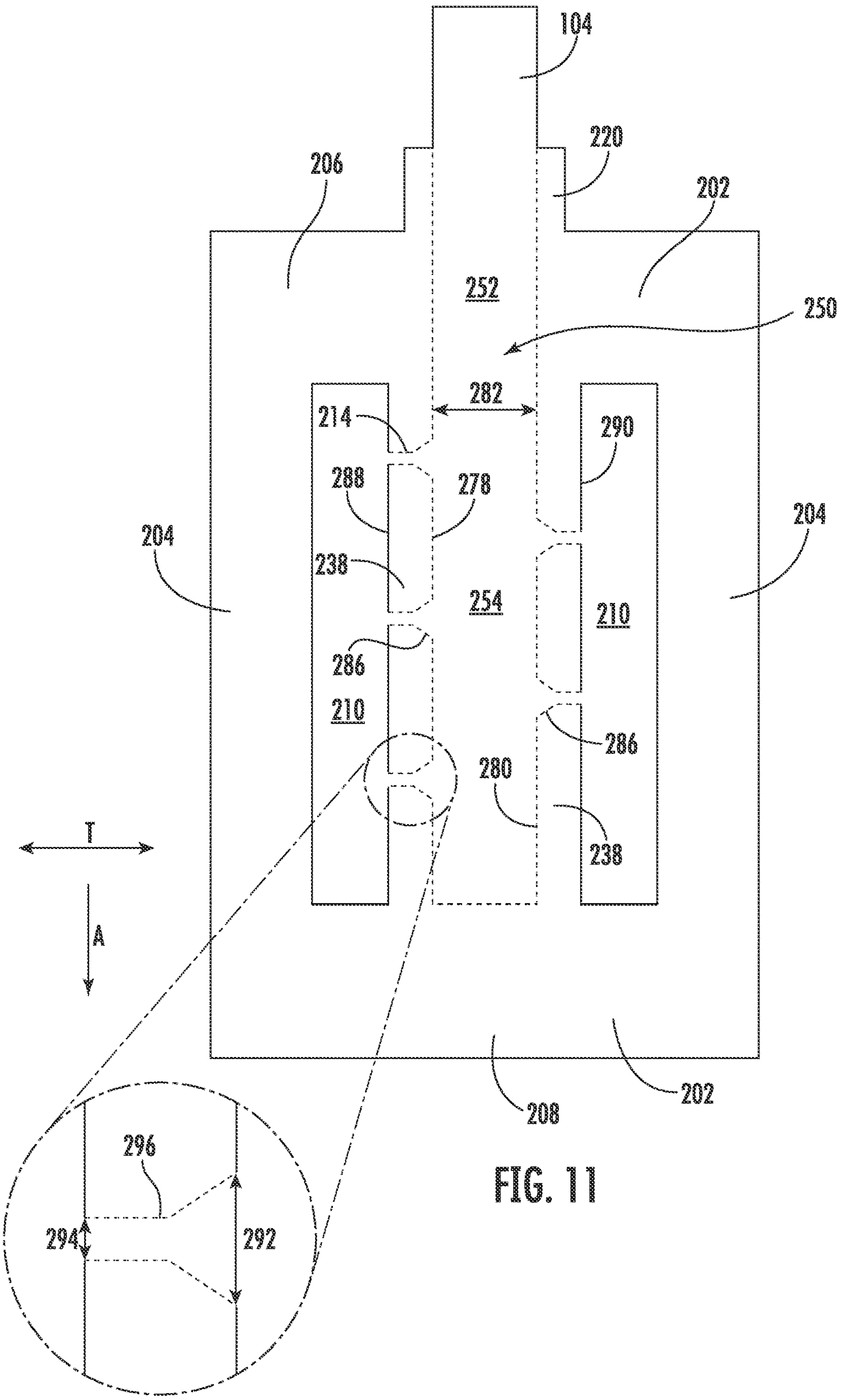
FIG. 11 illustrates a cross-sectional plan view of a fuel injector in accordance with embodiments of the present disclosure.
Figure 12:
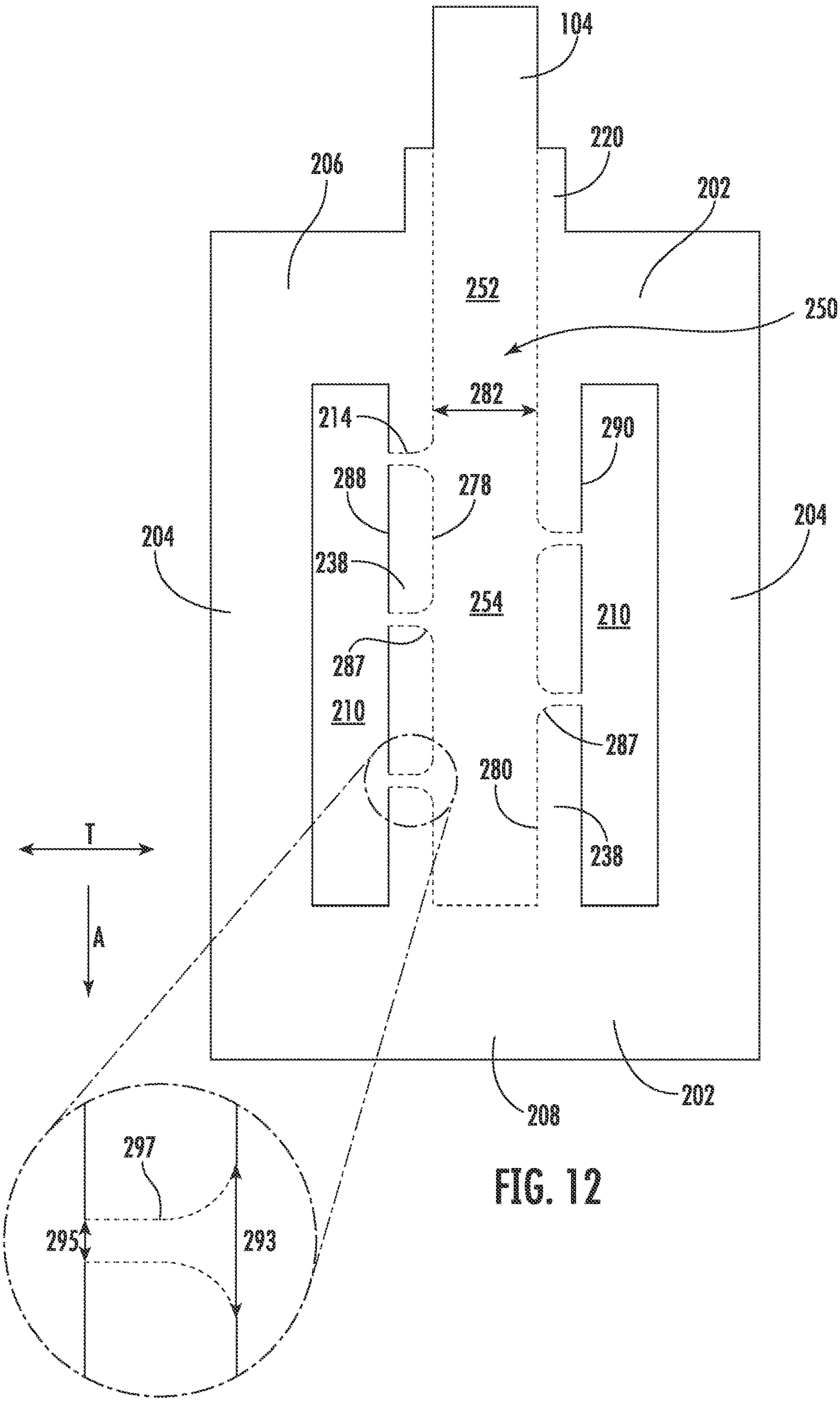
FIG. 12 illustrates a cross-sectional plan view of a fuel injector in accordance with embodiments of the present disclosure.

In other embodiments, such as the embodiment shown in FIGS. 11 and 12, the first and the second interior surfaces 278, 280 may be straight such that the transverse length 282 is uniform in the axial direction. In this way, in particular embodiments, the fuel passage 254 may vary in only radial length, only in transverse length, or both radial length and transverse length.

In the embodiment shown in FIG. 10, the fuel passage 254 may converge or taper as it extends axially from the inlet plenum 252, such that the transverse length 282 decreases at a constant rate in the axial direction. As shown, the oppositely disposed walls 238 of the fuel injection member 260 may include oppositely disposed interior surfaces 278, 280, which form the flow boundary in the transverse direction T for the fuel traveling through the fuel passage 254. In the embodiment shown in FIG. 10, the interior surfaces 278, 280 may taper towards one another at a constant rate, thereby causing a transverse length 282 and the overall cross-sectional area of the fuel passage 254 to decrease along the axial direction A. Gradually reducing the transverse length 282 in the fuel passage 254 may advantageously reduce flow separation, recirculation, and flow vortices of the fuel within the fuel passage.

As shown in FIGS. 9 and 10, each of the plurality of fuel ports 214 may be defined within the walls 238 of the fuel injection member 260. More specifically, each fuel port 214 of the plurality of fuel ports 214 may extend between a respective interior surface 278, 280 of the walls 238 and a respective exterior surface 288, 290 of the walls 238.

As shown in FIG. 11, each of the plurality of fuel ports 214 may include a chamfered inlet 286. The chamfered inlet 286 may be conically shaped such that the fuel port 214 gradually tapers from a first diameter 292 at the inlet to a second diameter 294 at a transition point 296 disposed between the inlet and the outlet of the fuel port 214. As shown in FIG. 11, the first diameter 292 may be larger than the second diameter 294. At the transition point 296, each of the fuel ports 214 may transition from being conically shaped to being cylindrically shaped, such that the second diameter is constant from the transition point 296 to the outlet of the fuel port 214. Utilizing fuel ports 214 having chamfered inlets 286 may advantageously provide a more uniform fuel distribution within the first opening 210, which allows for a more homogeneous mixture of fuel and air entering the secondary combustion chamber 60. As discussed herein, an evenly mixed fuel/air mixture may increase the overall performance of the gas turbine 10.

As shown in FIG. 12, each of the plurality of fuel ports 214 may include a rounded inlet 287. For example, the rounded inlet 287 of the each of the fuel ports 214 may be generally convex or may be otherwise rounded, such that the fuel port 214 gradually tapers from a first diameter 293 at the inlet to a second diameter 295 at a transition point 297 disposed between the inlet and the outlet of the fuel port 214. As shown in FIG. 11, the first diameter 293 may be larger than the second diameter 295. At the transition point 297, each of the fuel ports 214 may transition from being rounded to being cylindrically shaped, such that the second diameter 295 is constant from the transition point 297 to the outlet of the fuel port 214. Utilizing fuel ports 214 having rounded inlets 287 may advantageously provide a more uniform fuel distribution within the first opening 210, which allows for a more homogeneous mixture of fuel and air entering the secondary combustion chamber 60. As discussed herein, an evenly mixed fuel/air mixture may increase the overall performance of the gas turbine 10.

As disclosed herein, varying the cross-sectional area of the fuel passage 254 along the length of the fuel injection member 260, instead of, e.g., having a fuel passage with a uniform cross-sectional area, advantageously minimizes the recirculation, flow separation, and flow vortices of fuel traveling through the fuel passage 254. This cross-sectional variation results in an equal fuel distribution through the fuel ports 214. With an equal fuel distribution, the mixing of fuel and air within the fuel injector 200 is increased, thereby increasing the overall operating efficiency of the gas turbine 10. In addition, reducing the cross-sectional area of the fuel passage 254 in certain portions allows for the fuel to have a much more uniform pressure along the entire length of the fuel injection member 260. For example, there is a loss in pressure across each of the fuel ports 214, but the reduction in cross-sectional area of the fuel passage 254 increases fuel pressure, which equalizes the drop caused by the fuel ports 214.

This written description uses examples to disclose the invention, including the best mode, and also to enable any person skilled in the art to practice the invention, including making and using any devices or systems and performing any incorporated methods. The patentable scope of the invention is defined by the claims and may include other examples that occur to those skilled in the art. Such other examples are intended to be within the scope of the claims, if they include structural elements that do not differ from the literal language of the claims, or if they include equivalent structural elements with insubstantial differences from the literal language of the claims.

What is claimed is:

1. A fuel injector comprising:

a first end wall and a second end wall disposed opposite from the first end wall;

side walls extending between the first end wall and the second end wall, wherein the first end wall, the second end wall, and the side walls collectively define an opening for passage of air;

at least one fuel injection member disposed within the opening and extending between the end walls; and a fuel circuit defined within the fuel injector, the fuel circuit comprising:

an inlet plenum defined within the first end wall of the fuel injector; and a fuel passage extending from and in fluid communication with the inlet plenum, the fuel passage defined within the at least one fuel injection member, wherein the fuel passage has a cross-sectional area that varies along a length of the fuel injection member relative to an exterior cross-sectional area that is uniform along the entire length of the fuel injection member such that the fuel passage includes an interior shape that has at least one curvilinear portion and that is different than an exterior shape of the fuel injection member.

2. The fuel injector as in claim 1, further comprising a plurality of fuel ports defined on the fuel injection member, the plurality of fuel ports providing for fluid communication between the fuel passage and the opening.

3. The fuel injector as in claim 2, wherein each of the plurality of fuel ports includes one of a chamfered inlet or a rounded inlet.

4. The fuel injector as in claim 1, wherein the cross-sectional area of the fuel passage gradually converges from the inlet plenum to the second end wall of the fuel injector.

5. The fuel injector as in claim 1, wherein the fuel passage includes a first converging portion, a diverging portion, and a second converging portion.

6. The fuel injector as in claim 1, wherein the at least one fuel injection member comprises a pair of fuel injection members disposed between the side walls, wherein the fuel passage is defined within a first fuel injection member of the pair of fuel injection members and a second fuel passage is defined within the second fuel injection member of the pair of fuel injection members.

7. The fuel injector as in claim 6, wherein the fuel passage and the second fuel passage each have a respective cross-sectional area that varies from the inlet plenum to the second end wall.

8. The fuel injector as in claim 6, wherein the side walls comprise a first side wall fuel injection member and a second side wall fuel injection member, wherein a first side wall fuel passage is defined within the first side wall fuel injection member and a second side wall fuel passage is defined within the second side wall fuel injection member, and wherein the first side wall fuel passage and the second side wall fuel passage extend from and are in fluid communication with the inlet plenum.

9. The fuel injector as in claim 8, wherein the first side wall fuel passage and the second side wall fuel passage each have a respective cross-sectional area that varies from the inlet plenum to the second end wall.

10. A combustor comprising:
- an end cover;
- at least one fuel nozzle extending between the end cover and a combustion liner, wherein the combustion liner extends downstream of the at least one fuel nozzle and defines a combustion chamber;
- a fuel injector disposed downstream from the at least one fuel nozzle and in fluid communication with the combustion chamber, the fuel injector comprising:
  - a first end wall and a second end wall disposed opposite from the first end wall;
  - side walls extending between the first end wall and the second end wall, wherein the first end wall, the second end wall, and the side walls collectively define an opening for passage of air;
  - at least one fuel injection member disposed within the opening and extending between the end walls; and
  - a fuel circuit defined within the fuel injector, the fuel circuit comprising:
    - an inlet plenum defined within the first end wall of the fuel injector; and
    - a fuel passage extending from and in fluid communication with the inlet plenum, the fuel passage defined within the at least one fuel injection member, wherein the fuel passage has a cross-sectional area that varies along a length of the fuel injection member relative to an exterior cross-sectional area that is uniform along the entire length of the fuel injection member such that the fuel passage includes an interior shape that has at least one curvilinear portion and that is different than an exterior shape of the fuel injection member.

11. The combustor as in claim 10, further comprising a plurality of fuel ports defined on the fuel injection member, the plurality of fuel ports providing for fluid communication between the fuel passage and the opening.

12. The combustor as in claim 11, wherein each of the plurality of fuel ports includes one of a chamfered inlet or a rounded inlet.

13. The combustor as in claim 10, wherein the cross-sectional area of the fuel passage gradually converges from the inlet plenum to the second end wall of the fuel injector.

14. The combustor as in claim 10, wherein the fuel passage includes a first converging portion, a diverging portion, and a second converging portion.

15. The combustor as in claim 10, wherein the at least one fuel injection member comprises a pair of fuel injection members disposed between the side walls, wherein the fuel passage is defined within a first fuel injection member of the pair of fuel injection members and a second fuel passage is defined within a second fuel injection member of the pair of fuel injection members.

16. The combustor as in claim 15, wherein the side walls comprise a first side wall fuel injection member and a second side wall fuel injection member, wherein a first side wall fuel passage is defined within the first side wall fuel injection member and a second side wall fuel passage is defined within the second side wall fuel injection member, and wherein the first side wall fuel passage and the second side wall fuel passage extend from and are in fluid communication with the inlet plenum.

17. The combustor as in claim 16, wherein the first side wall fuel passage and the second side wall fuel passage each have a respective cross-sectional area that varies from the inlet plenum to the second end wall.

18. A turbomachine comprising:
- a compressor section;
- a turbine section; and
- a combustor disposed downstream from the compressor section and upstream from the turbine section, the combustor comprising:
  - a head end portion including an end cover;
  - at least one fuel nozzle extending between the end cover and a combustion liner, wherein the combustion liner extends downstream from the head end portion and defines a combustion chamber;
  - a fuel injector disposed downstream from the at least one fuel nozzle and in fluid communication with the combustion chamber, the fuel injector comprising:
    - a first end wall and a second end wall disposed opposite the first end wall;
    - side walls extending between the first end wall and the second end wall, wherein the first end wall, the second end wall, and the side walls collectively define an opening for passage of air;
    - at least one fuel injection member disposed within the opening and extending between the end walls; and
    - a fuel circuit defined within the fuel injector, the fuel circuit comprising:
      - an inlet plenum defined within the first end wall of the fuel injector; and
      - a fuel passage extending from and in fluid communication with the inlet plenum, the fuel passage defined within the at least one fuel injection member, wherein the fuel passage has a cross-sectional area that varies along a length of the fuel injection member relative to an exterior cross-sectional area that is uniform along the entire length of the fuel injection member such that the fuel passage includes an interior shape that has at least one curvilinear portion and that is different than an exterior shape of the fuel injection member.

* * * * *